J. N. SAWKINS.
CAR-BRAKE.

No. 169,593. Patented Nov. 2, 1875.

WITNESSES
Chas. J. Gooch
Le Blond Burdett

INVENTOR
James N. Sawkins
By Knight Bros Attorneys

UNITED STATES PATENT OFFICE.

JAMES N. SAWKINS, OF PHILADELPHIA, PENNSYLVANIA.

IMPROVEMENT IN CAR-BRAKES.

Specification forming part of Letters Patent No. 169,593, dated November 2, 1875; application filed October 2, 1875.

*To all whom it may concern:*

Be it known that I, JAMES NEVILLE SAWKINS, a subject of the Queen of Great Britain, temporarily residing at Philadelphia, in the State of Pennsylvania, have invented certain new and useful Brakes for Cars, of which the following is a specification:

The subject of my invention is a car-brake, with a shoe constructed with the bearing-surface eccentric to the pivot on which it turns, and operated through the medium of an attached lever, as hereinafter described.

The invention further consists in combining, with a brake of the construction specified, a pedal and ratchet-bar or toothed catch, enabling the operator to lock the brake in its effective position when required, and to fix it with any desired pressure upon the bearing-surface. The eccentric shoe bears on a friction-wheel on the axle, which friction-wheel may be one of the carrying-wheels of the car or not, as preferred.

Figure 1:
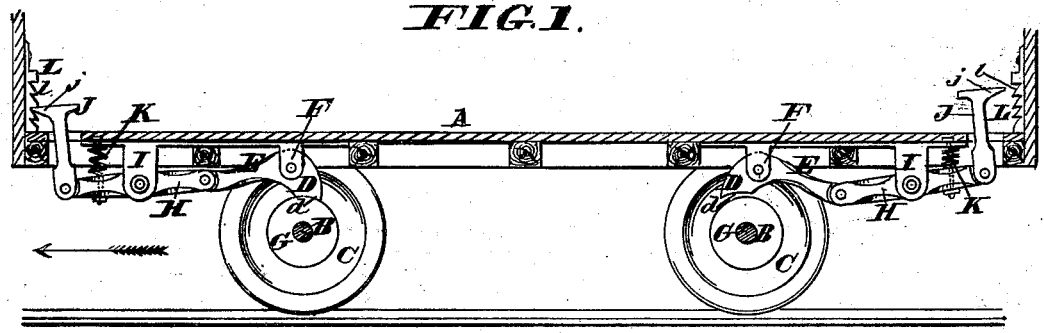
Figure 2:
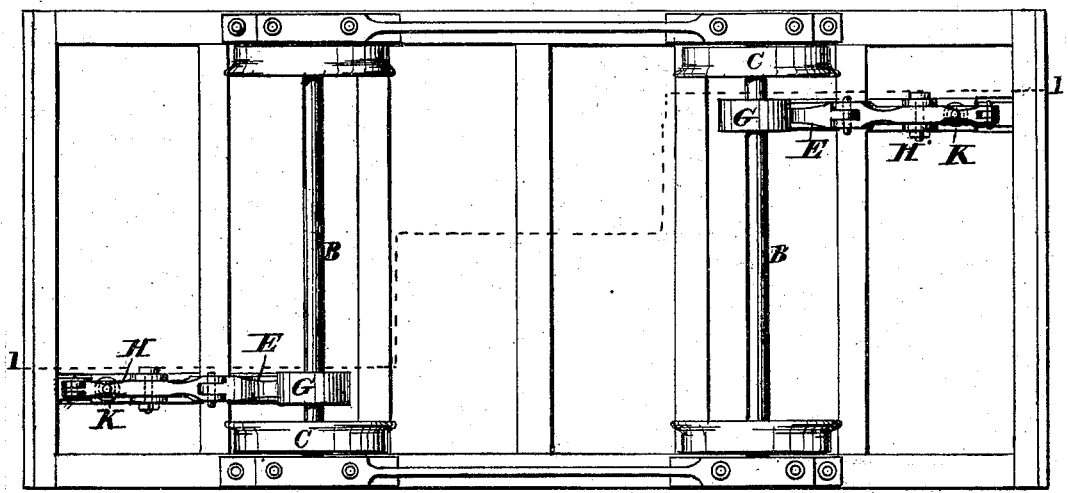
Figure 3:
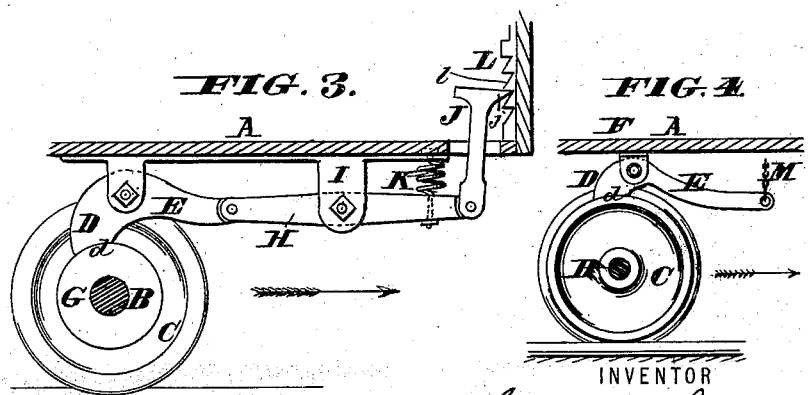
Figure 4:
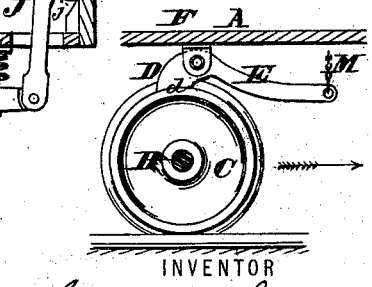

In the accompanying drawings, Figure 1 is a horizontal section of the running-gear of a car, illustrating my invention. Fig. 2 is a side view of the same. Fig. 3 is a longitudinal section of a portion of one end on a larger scale. Fig. 4 illustrates a modification.

The illustration selected shows the invention in its application to horse-cars without trucks. It is equally applicable to truck-cars without any change of the essential features of the invention. The bed or frame A, axles B, and wheels C are made of common construction. D represents my eccentric brake-shoe, constructed in one piece, with a lever-arm, E, projecting horizontally from it, and giving to it the character of a bell-crank, F representing the fulcrum on which it turns. The bearing-surface $d$ of the shoe acts upon the periphery of a friction-wheel, G, which is rigidly fixed on the axle, and may constitute, or be substituted or replaced by, one of the carrying or running wheels of the car, if preferred, as shown in Fig. 4.

In my preferred application of the invention, adapting it for use by the foot, as herein illustrated, the free end of the lever E is pivoted to a second lever, H, fulcrumed to a bracket, I, and connected at its other end with a pedal, J, in convenient position to be depressed by the foot of the driver. K represents a spring for retracting the levers and releasing the axle when the pressure is removed. L is a ratchet-rack, adapted by its teeth $l$ to hold the pedal J at any desired depression, to graduate the pressure upon the friction-wheel. The upper end of the pedal is formed with a projecting lip, $j$, to engage with the teeth of the rack.

The operation is as follows: The fulcrum F of the eccentric shoe being located on one side of the axle, a downward pressure on the lever E causes the shoe to bear against the periphery of the friction-wheel G with any desired force, so as to check the speed of the car, or completely lock the wheels, if desired. The ratchet-teeth of the rack, $l$, enable the operator, while fixing the brake, to graduate the pressure as may be required, and to set the brake with any necessary force. If it is to be applied with full force, this may be effected by pressing directly down on the pedal. One of the pedals and connecting-levers is located at each end of the car, and preferably on the right side, as shown, so as to be in convenient position for operation by the foot of the driver.

For applying my invention through the medium of hand-winches, or by the air-brake apparatus, the pedals are dispensed with, the chain or rod M, Fig. 4, being attached to the free end of the lever E, and passing over pulleys in the customary manner.

The following is what I claim as new, and desire to secure by Letters Patent:

1. The eccentric shoe D and lever E, constructed and fulcrumed in the manner herein described, so that the bearing-surface $d$ will move in a direction nearly tangential to the wheel on which it acts.

2. The combination of the shoe D, levers E H, pedal J, and the rack L, for graduating the pressure and locking the brake, as explained.

J. N. SAWKINS.

Witnesses:
OCTAVIUS KNIGHT,
ALEX. H. GALT.